(12) United States Patent
Fink

(10) Patent No.: US 8,272,646 B2
(45) Date of Patent: Sep. 25, 2012

(54) QUICK CHANGE JAW SYSTEM FOR CHUCKS

(76) Inventor: Nicholas A. Fink, Manhassat, NY (US)

( * ) Notice: Subject to any disclaimer, the term of this patent is extended or adjusted under 35 U.S.C. 154(b) by 515 days.

(21) Appl. No.: 12/455,050

(22) Filed: May 28, 2009

(65) Prior Publication Data

US 2010/0301570 A1    Dec. 2, 2010

(51) Int. Cl.
B23B 31/16    (2006.01)
(52) U.S. Cl. ............ 279/124; 279/110; 279/152
(58) Field of Classification Search ......... 279/110, 279/123, 124, 152–154; 269/279, 280, 282–284; B23B 31/16
See application file for complete search history.

(56) References Cited

U.S. PATENT DOCUMENTS

| | | | | |
|---|---|---|---|---|
| 2,667,358 | A * | 1/1954 | Highberg | 279/123 |
| 3,219,356 | A * | 11/1965 | Wilterdink et al. | 279/123 |
| 4,569,530 | A * | 2/1986 | Cross | 279/123 |
| 5,129,662 | A * | 7/1992 | Kempken | 279/123 |
| 5,158,307 | A * | 10/1992 | Toyano et al. | 279/121 |
| 5,174,589 | A * | 12/1992 | Gulde | 279/124 |
| 5,190,300 | A * | 3/1993 | Jaggers | 279/124 |
| 5,464,232 | A * | 11/1995 | Chizmadia | 279/124 |
| 5,529,320 | A * | 6/1996 | Roberts et al. | 279/124 |
| 5,845,912 | A * | 12/1998 | Grupa | 279/124 |
| 6,022,010 | A * | 2/2000 | Bernstein | 269/279 |
| 6,264,210 | B1 * | 7/2001 | Difasi et al. | 279/124 |
| 6,491,305 | B2 * | 12/2002 | Sida | 279/124 |

FOREIGN PATENT DOCUMENTS

| | | | | |
|---|---|---|---|---|
| JP | 59019612 | A | * | 2/1984 |
| JP | 59156602 | A | * | 9/1984 |
| JP | 63229207 | A | * | 9/1988 |
| JP | 03060904 | A | * | 3/1991 |

* cited by examiner

Primary Examiner — Eric A Gates
(74) Attorney, Agent, or Firm — Gerald E. Hespos; Michael J. Porco

(57) ABSTRACT

A quick change jaw system for chucks is provided. The quick change jaw assembly includes a master jaw including a first pair of coplanar abutment surfaces defining a first aperture; a clamping device including a dovetail portion being disposed in the first aperture of the master jaw, wherein the dovetail portion rests above the first pair of coplanar top surfaces of master jaw; a top jaw formed with a groove longitudinally extending along a length of the top jaw, the groove being complementary to the dovetail portion and configured for engaging the dovetail portion, the top jaw including a second pair of coplanar abutment surfaces extending along opposite sides of the groove; and a cam for actuating the clamping device for urging the second pair of coplanar abutment surfaces of the top jaw into coengagement with the first pair of coplanar abutment surfaces of the master jaw.

15 Claims, 8 Drawing Sheets

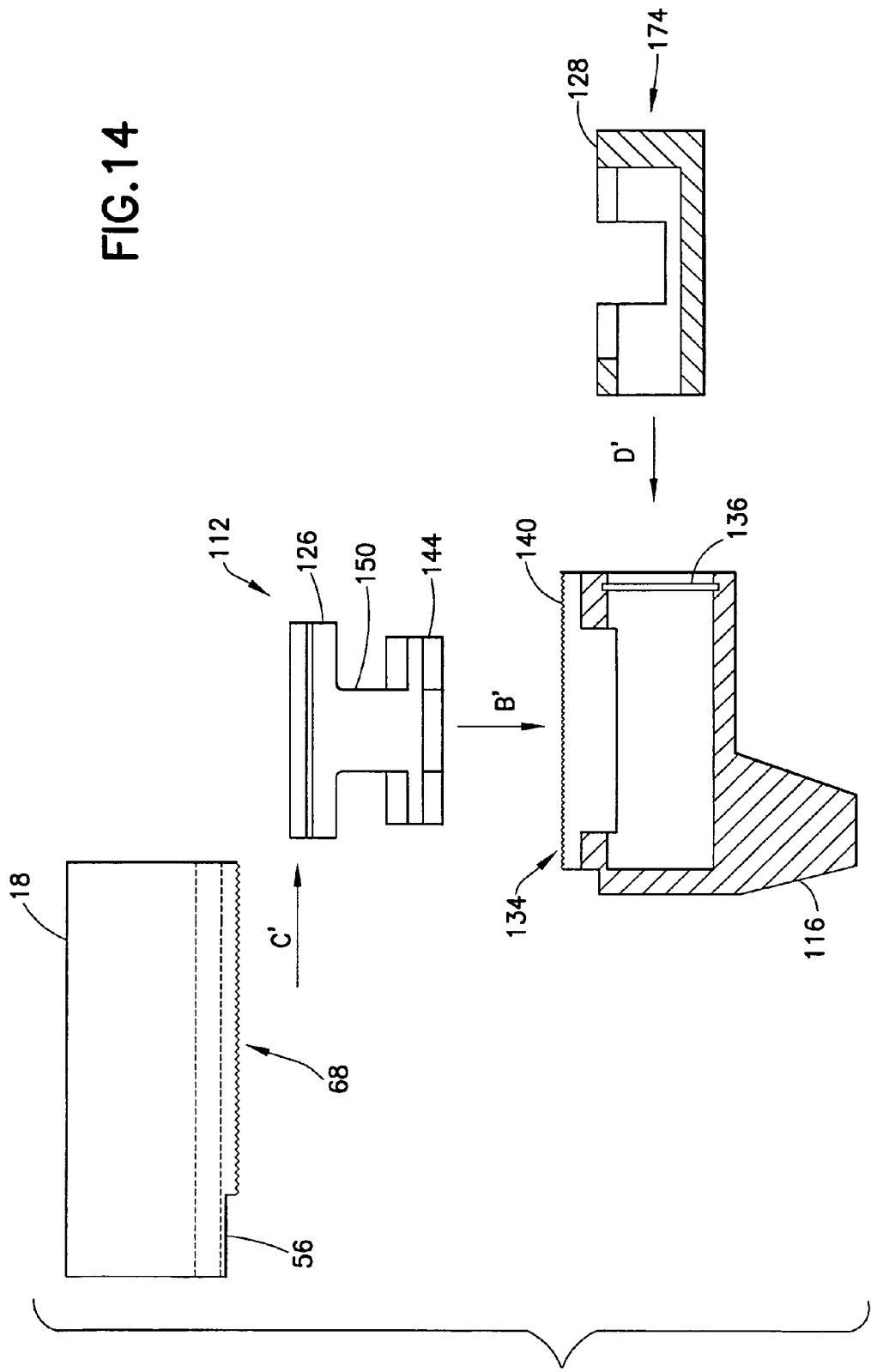

QUICK CHANGE JAW SYSTEM FOR CHUCKS

BACKGROUND

1. Field

The present disclosure relates generally to chucks for rotary machine tools, and more particularly, to a quick change jaw system for a chuck.

2. Description of the Related Art

Quick-change jaw assemblies of the type with which the present invention is concerned are typically used in chucks for rotary machine tools. Such a chuck jaw assembly typically includes a radially displaceable master jaw mounted on the chuck body and a top jaw releasably secured to the master jaw to facilitate rapid jaw change. The top jaw provides a clamping or gripping surface adapted to engage a workpiece at either its outside or inside diameter and to hold the workpiece during a machining operation. Normally, the gripping or clamping surfaces on the top jaws are machined after the top jaws have been mounted on the master jaws to assure concentricity of the clamping surfaces relative to the axis of rotation of the chuck.

Chucks having jaws of the aforedescribed quick-change type are particularly well suited for use in repetitive small batch production operations where frequent changeover is required. At the end of each production run, it is usually necessary to remove the top jaws from the chuck and replace them with another set of top jaws particularly adapted to accommodate the next workpiece which may be of a substantially different size or configuration. Desired close workholding tolerances can be maintained by remachining the top jaws after changeover. However, the remachining process is costly and time consuming.

Another approach to the maintenance of precise tolerances after jaw changeover requires that the top jaws and master jaws be marked and maintained as matched pairs for subsequent use. While this practice is advisable with all chucks, this approach introduces the possibility of human error and makes it impossible to interchange top jaws from one chuck to another. If proper matching is not maintained, clamping surface tolerances may be lost and any spindle runout condition which may have existed in the initial jaw setup will be compounded in a subsequent mismatched jaw setup. Additionally, an inventory of required matched pairs can be very costly to maintain.

Heretofore, various jaw assemblies have been available which provide interchangability among top jaws so that the top jaws may be randomly assembled with the master jaws on a chuck without remachining while still maintaining clamping surface tolerances. However, such jaw assemblies generally employ complex mounting mechanisms and are usually costly to produce. Further, such interchangeable jaw assemblies often employ spring biasing mechanisms for urging reference surfaces on the master and top jaws into coengagement and often fail to provide the degree of reliability and chucking tolerances desired.

Therefore, a need exists for an improved interchangeable type quick change jaw assembly of simple, durable construction wherein a single fastener which releasably secures a top jaw to a master jaw also functions to provide a positive sustained biasing force of substantial magnitude for urging reference surfaces on the respective jaws into and maintaining the surfaces in coengagement to assure precise top jaw and master jaw alignment.

SUMMARY OF THE INVENTION

A quick change jaw system for chucks is provided. A quick change jaw assembly for a chuck having a rotational axis includes a master jaw configured for mounting to the chuck for movement toward and away from the rotational axis, the master jaw including a first pair of coplanar abutment surfaces defining a first aperture; a retaining or clamping device including a dovetail portion being disposed in the first aperture of the master jaw, wherein the dovetail portion rests above the first pair of coplanar top surfaces of master jaw; a top jaw formed with a groove longitudinally extending along a length of the top jaw, the groove being complementary to the dovetail portion and configured for engaging the dovetail portion, the top jaw including a second pair of coplanar abutment surfaces extending along opposite sides of the groove; and a cam disposed in the master jaw for actuating the retaining or clamping device for urging the second pair of coplanar abutment surfaces of the top jaw into coengagement with the first pair of coplanar abutment surfaces of the master jaw.

BRIEF DESCRIPTION OF THE DRAWING

The above and other aspects, features, and advantages of the present disclosure will become more apparent in light of the following detailed description when taken in conjunction with the accompanying drawings.

FIG. 14 is an exploded view of the components of the jaw assembly in accordance with a second embodiment of the present disclosure;

Figure 1:
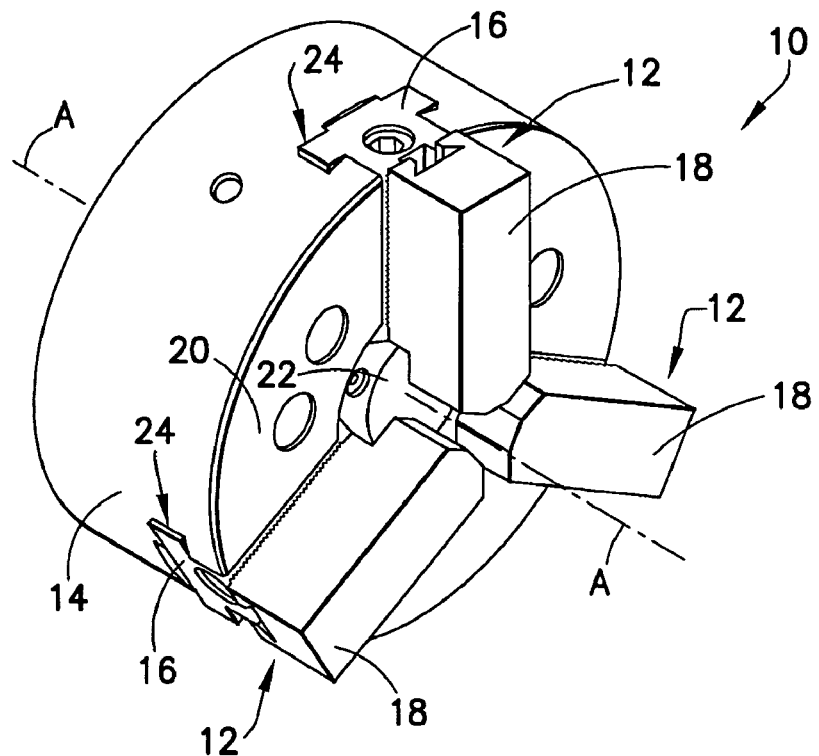
FIG. 1 is a perspective view of a chuck employing a quick change jaw system in accordance with a preferred embodiment of the present disclosure.

To facilitate understanding, the images in the drawings are simplified for illustrative purposes and are not depicted to scale.

The appended drawings illustrate exemplary embodiments of the present disclosure and, as such, should not be considered as limiting the scope of the disclosure that may admit to other equally effective embodiments. Correspondingly, it has been contemplated that features or steps of one embodiment may beneficially be incorporated in other embodiments without further recitation.

In some embodiments, particular method steps of the discussed methods are performed in the depicted order. In alternate embodiments, in the respective methods, at least two method steps or portions thereof may be performed contemporaneously, in parallel, or in a different order.

DETAILED DESCRIPTION OF THE INVENTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components.

Figure 2:
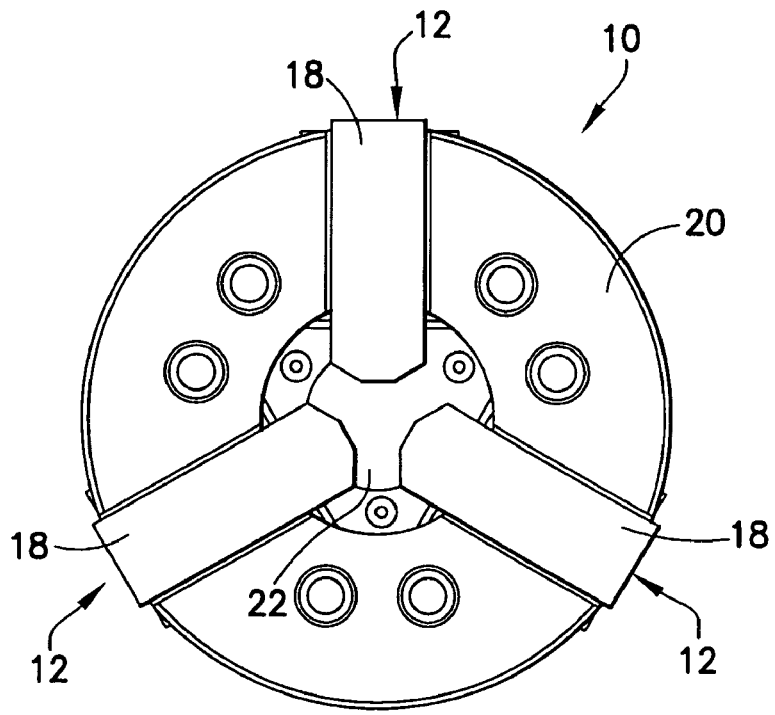
FIG. 2 is a front elevational view of the chuck shown in FIG. 1.
Figure 3:
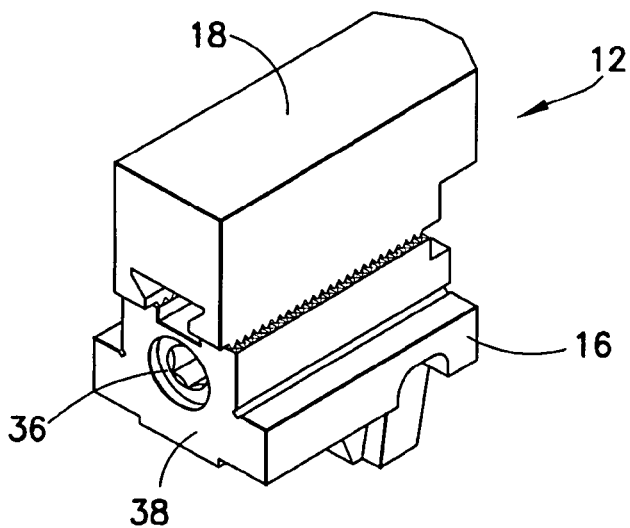
FIG. 3 is a rear perspective view of a jaw assembly in accordance with the preferred embodiment of the present disclosure.
Figure 4:
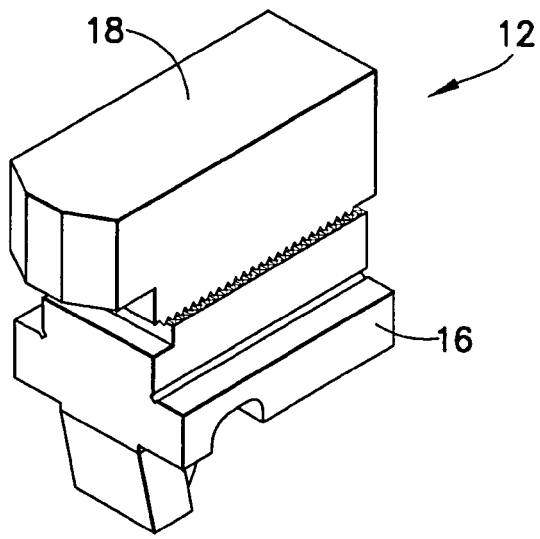
FIG. 4 is a front perspective view of the jaw assembly shown in FIG. 3.
Figure 5:
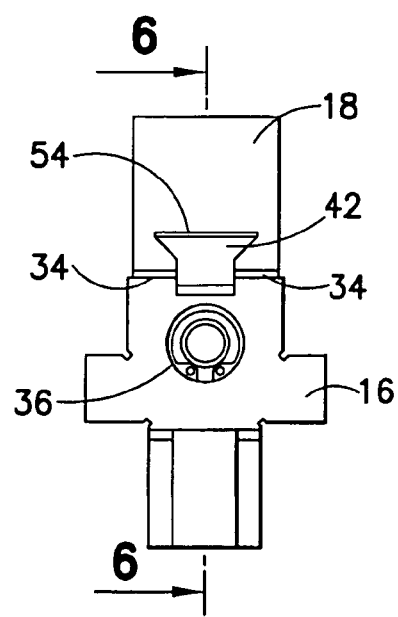
FIG. 5 is a rear elevational view of the jaw assembly shown in FIG. 3.
Figure 6:
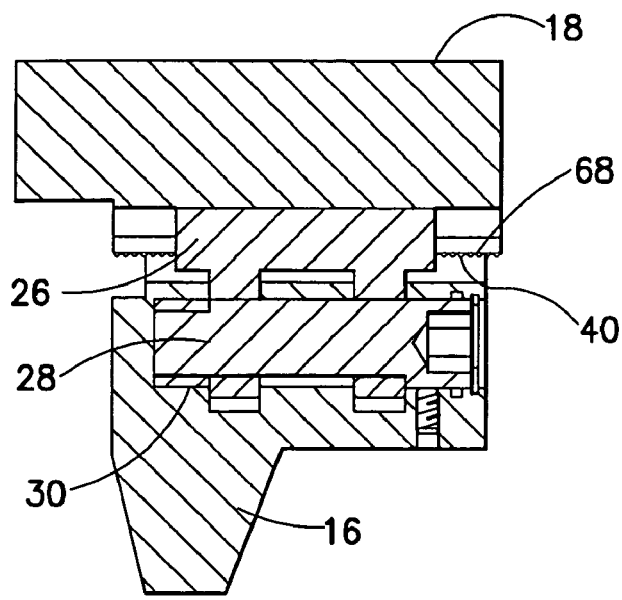
FIG. 6 is a sectional view of the jaw assembly shown in FIG. 5 taken along line 6-6.
Figure 7:
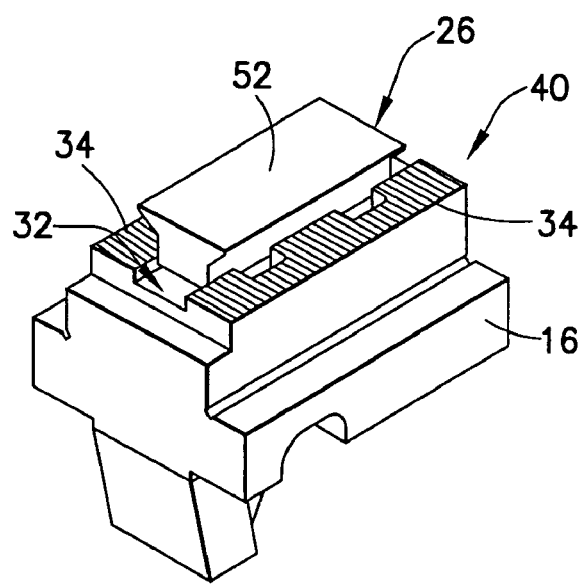
FIG. 7 is a perspective view of the jaw assembly with the top jaw removed.
Figure 8:
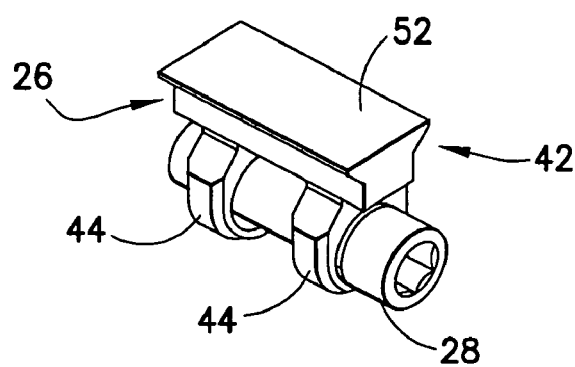
FIG. 8 is a perspective view of a dovetail clamp and cam employed in the jaw assembly of FIG. 3 in accordance with the preferred embodiment of the present disclosure.

Referring to FIGS. 1-2, a power actuated three jaw chuck indicated generally at 10 has quick-change jaw assemblies 12 embodying the present invention. Chuck 10 may be suitable for use in any machine tool which requires a rotary or stationary chuck, but is particularly adapted for use in a high production machine tool and may be arranged to clamp and hold a workpiece (not shown) at either its outside diameter (O.D.) or its inside diameter (I.D.). As shown in the drawings, the jaw assemblies 12 are configured for O.D. chucking. The chuck 10 includes a hollow generally cylindrical chuck body 14, which contains a jaw actuating mechanism (not shown) and has a central axis of rotation designated by the letter A in FIG. 1. Each jaw assembly 12 includes a master jaw 16 supported by the chuck body 14 for radial movement generally toward and away from the axis of rotation A, and a top jaw 18 releasably secured to the master jaw 16. In accordance with the present disclosure, the top jaws 18 are interchangeably mounted on the master jaws 16 so that any one of the top jaws 18 may be mounted on any one of the master jaws 16 with minimal loss of chucking concentricity.

Considering now the chuck assembly 10 in further detail, the cylindrical chuck body 14 has a radially disposed front wall 20 and a coaxial cylindrical central bore 22 which opens through the front wall. Three equiangularly-spaced, generally rectangular openings 24 are formed in the chuck body 14, communicate with the interior of the chuck body, and open axially outwardly through the front wall 20. Each master jaw 16 is received and supported within an associated one of the openings 24, complements at least a portion of the opening, and is arranged for limited sliding movement in a radial direction within the opening 24 and relative to the chuck body 14 generally toward and away from the chuck central axis A. A power operated jaw actuating mechanism (not shown) contained within the chuck body 14 operates the chuck 10 to move the three master jaws 16 in unison and in a radially direction either towards or away from the central axis A to clamp and hold a workpiece at either its O.D. or its I.D., as required. The chuck 10 jaw actuating mechanism is preferably power operated and may, for example, be hydraulically or pneumatically powered. Such power operated chuck jaw actuating mechanisms are well known in the chucking art. However, it is contemplated that the quick-change jaw assemblies of the present disclosure may be employed in a wide variety of chuck applications of either power or manually operated type and it is for this reason that the particular actuating mechanism for operating the jaw assemblies 12 is not shown.

Referring to FIGS. 3-12, each jaw assembly 12 includes a master jaw 16 and top jaw 18. The top jaw 18 is removably mounted to the master jaw 16 by a dovetail configuration. Furthermore, both master jaw 16 and top jaw 18 include complementary serrations which radially locate and retain the jaws 16,18 to each other, the details of which will be described below. It is to be appreciated that the top jaw 18 can be variably positioned along the master jaw 16.

The master jaw 16 is generally rectangular and includes a cavity for receiving a clamping device 26 and cam 28 for securing the top jaw 18 to the master jaw 16. A cavity 30 is accessible from a first aperture 32 configured on a top surface 34 of the master jaw 16 and a second aperture 36 configured on a rear end 38 of the master jaw 16. The first aperture 32 is configured for receiving the clamping device 26, also known as a T-nut or dovetail nut, and the second aperture 36 is configured for receiving the cam 28, as will be described in detail below. The top surface 34 of master jaw 16 includes serrations 40 for mating with complementary serrations of top jaw 18.

Clamping device 26 includes a dovetail portion 42 and at least one ring member 44 extending from the dovetail portion 42. In the exemplary embodiment shown, the clamping device 26 has two ring members 44 but one or more ring members are contemplated depending on the length of the jaw assembly. The dovetail portion 42 is formed with a pair of longitudinally extending flat side walls 46,48 which diverge laterally from one another and away from central portion 50. Each side wall 46,48 extends and projects away from the central portion 50 and leads to a planar surface base wall 52. When the clamping device 26 is disposed in the master jaw 16, the planar surface base wall 52 is parallel to top surface 34 of the master jaw 16.

Top jaw 18 is formed with a groove 54 longitudinally extending almost the entire length of the top jaw 18. The groove 54 is closed on one end to form abutment 56 of the top jaw 18 to prevent the top jaw 18 from sliding off of the dovetail portion 42 of clamping device 26 when the top jaw 18 engages the master jaw 16. The groove 54 is formed to match and complement the shape of the dovetail portion 42. Sidewalls 58,60 of groove 54 converge at the same angle as sidewalls 46,48 of dovetail portion 42 so as to define between them an included angle which is the same as that defined between sidewalls 46,48 of dovetail portion 42. Sidewalls 58,60 also converge toward one another as they extend downwardly and away from inner planar wall 62 which defines the bottom surface of groove 54. The lower portions of sidewalls 58,60 respectively extend down to a pair of coplanar abutment surfaces 64,66. Abutment surfaces 64,66 extend along opposite sides of groove 54 and are aligned in a common plane which is generally parallel to the inner planar wall 62 of groove 54. The abutment surfaces 64,66 of top jaw 18 includes serrations 68 for mating with complementary serrations 40 of master jaw 16.

Figure 9:
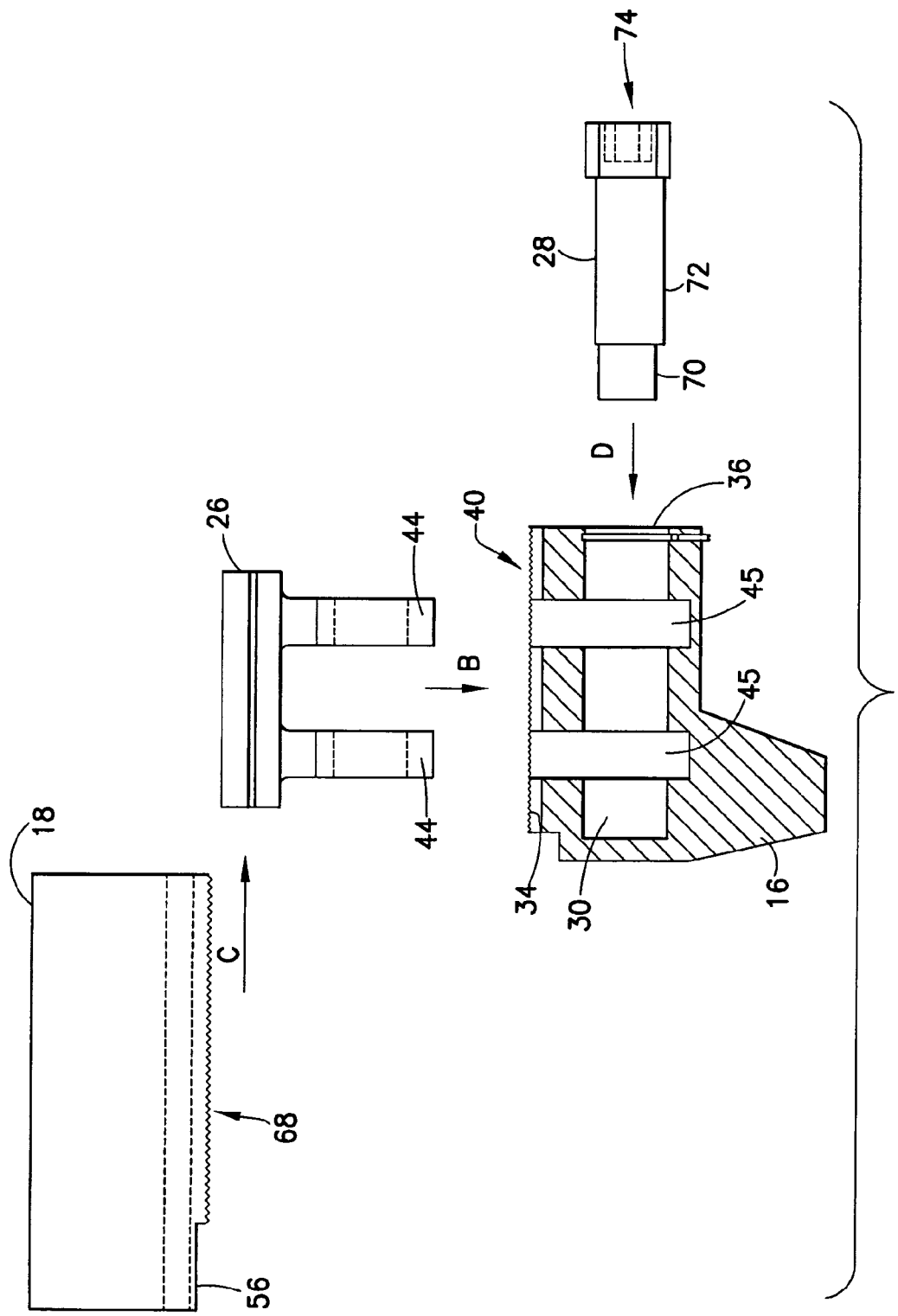
FIG. 9 is an exploded view of the components of the jaw assembly shown in FIG. 3.
Figure 10:
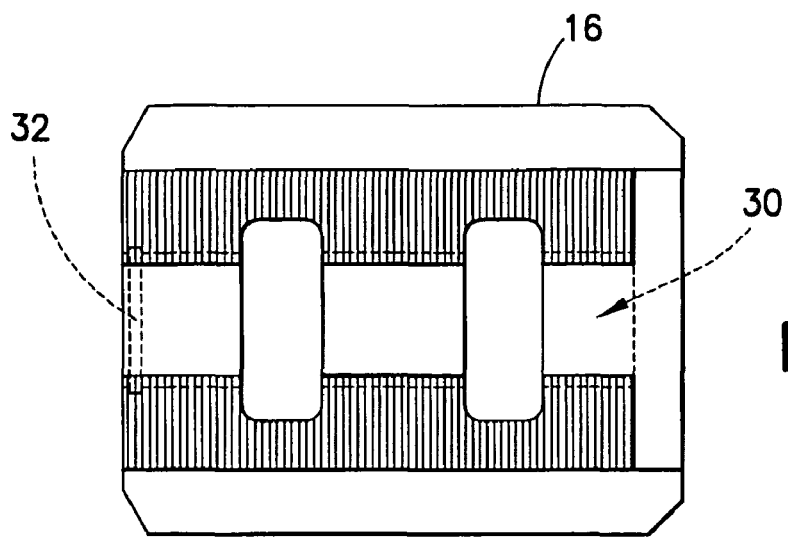
FIG. 10 is a top plan view of a master jaw in accordance with the preferred embodiment of the present disclosure.
Figure 11:
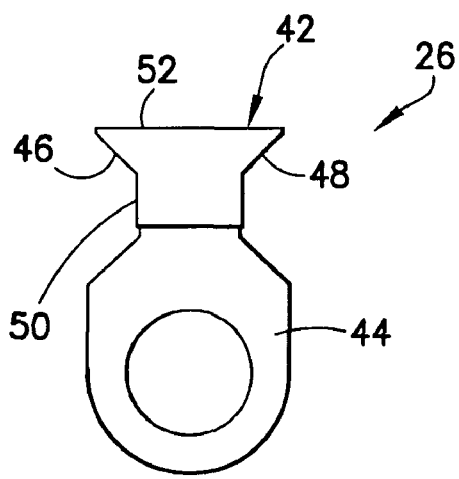
FIG. 11 is a side elevational view of the dovetail clamp of the preferred embodiment of the present disclosure.
Figure 12:
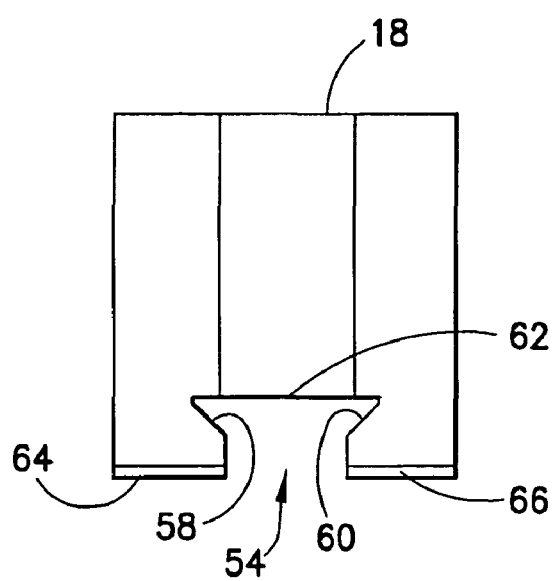
FIG. 12 is a side elevational view of the top jaw in accordance with the preferred embodiment of the present disclosure.

Referring to FIG. 9, the jaw assembly 12 is assembled by disposing clamping device 26 in cavity 30 of master jaw 16, as indicated by arrow B. Cavity 30 is configured to receive ring member 44 of clamping device 26 in cavity portions 45. When the clamping device 26 is disposed in the master jaw 16, the dovetail portion 42 rests above the coplanar top abutment surfaces 34 of master jaw 16 as most clearly shown in FIG. 7. Groove 54 of top jaw 18 is then aligned with dovetail portion 42 and the top jaw 18 is slid onto the dovetail portion 42 and into engagement with master jaw 16, as indicated be arrow C, until abutment 56 is contacted. It is to be appreciated that once the top jaw 18 is located in a desired position, the mating of the serrations 68 of the top jaw 18 and the serrations 40 of the master jaw 16 will prevent further movement of the top jaw 18.

Figure 13C:
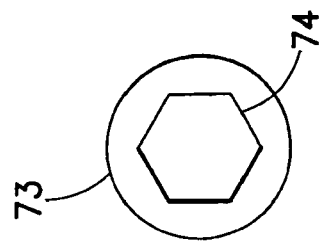
FIG. 13C is a front elevational view of the cam employed in the jaw assembly of FIG. 9.
Figure 13B:
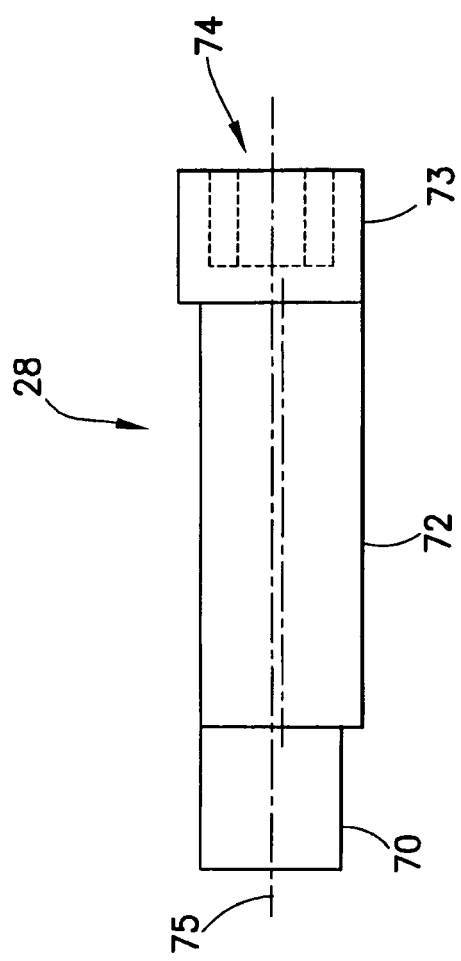
FIG. 13B is a side elevational view of the cam employed in the jaw assembly of FIG. 9.
Figure 13A:
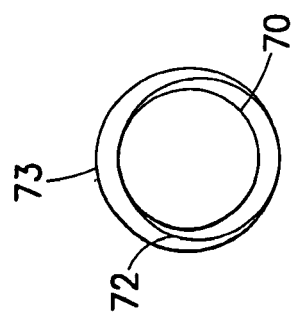
FIG. 13A is a rear elevational view of the cam employed in the jaw assembly of FIG. 9.
Figure 15:
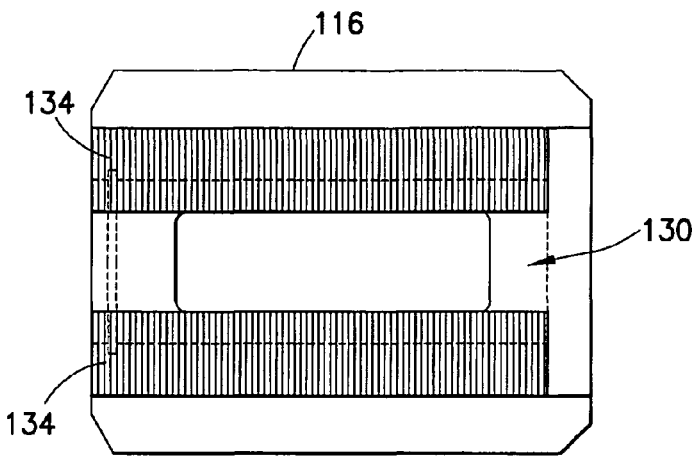
FIG. 15 is a top plan view of a master jaw employed in the jaw assembly of FIG. 14.
Figures 16, 17:
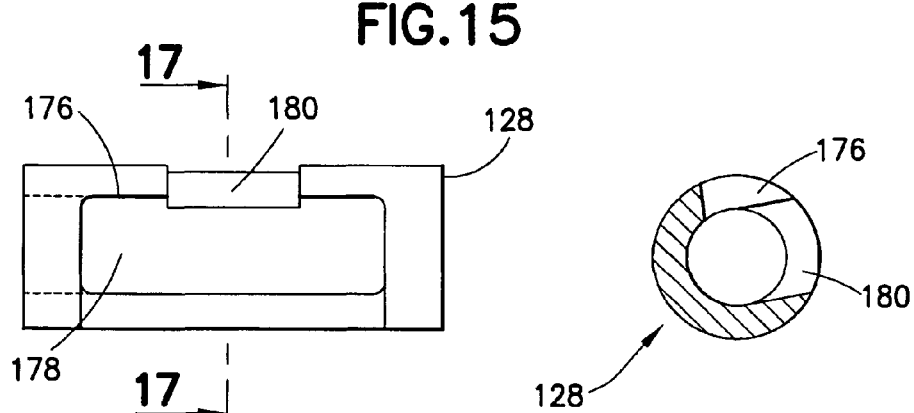
FIG. 16 is a top plan view of a cam employed in the jaw assembly of FIG. 14.
FIG. 17 is a side elevational view of the cam shown in FIG. 16 taken along line 17-17.

The top jaw 18 is securely fixed to the master jaw 16 by cam 28. Cam 28 is disposed in the second aperture 36 of the master jaw 18 and the cam 28 will pass through the two ring members 44 of the clamping device 26, as indicated by arrow D. Referring to FIGS. 13A-C, the cam 28 is formed with first guide portion 70, a second offset portion 72 and a head portion 73 positioned eccentric from each other along a central longitudinal axis 75 of the cam 28. As can be seen in FIGS. 13A-B, the offset portion 72 has a different center than the guide portion 70 and head portion 73. The cam 28 is further formed with a hexagonal aperture 74 in the head portion 73.

Once the cam 28 is disposed in the master jaw 16 through the ring members 44, the second offset portion 72 of the cam 28 will act upon the ring members 44, when a torque is applied to the head portion 73, to pull the dovetail portion 42 down in the direction of arrow B and subsequently the top jaw 18. The cam 28 will act upon the clamping device 26 by rotating the cam 28 via any suitable tool coupled to the hexagonal aperture 74. In this manner, the cam 28 drives the clamping device 26 in a downward motion along with the top jaw 18 urging the serrations 40,68 on the jaws into and maintaining the surfaces 34,64,66 in coengagement to assure precise top jaw and master jaw alignment.

Referring to FIGS. 14-18, another embodiment of a jaw assembly 112 in accordance with the present disclosure is illustrated. It is to be appreciated the top jaw 18 shown in FIG. 14 is of substantially similar construction than the top jaw shown in FIGS. 1-13 and therefore will not be described in detail.

Master jaw 116 is generally rectangular and includes generally rectangular cavity 130. The cavity 130 is configured to receive cam 128. Cam 128 is generally cylindrical and hollow with a rectangular aperture 176 on one portion of its outer wall to reveal cavity 178. One end of the cylindrical cam 128 is formed with a hexagonal aperture 74 which aids in rotating the cam 128 when fixing the top jaw 18 to the master jaw 116 as will be described below. Furthermore, the aperture 176 of cam 128 includes a cut-away portion 180 which facilitates actuation of the clamping device or T-nut 126.

Clamping device 126 includes dovetail portion 142 which is configured similar to the portion 42 and includes side walls 146,148 and base wall 152. The clamping device 126 further includes a generally cylindrical member 144 coupled to the dovetail portion 142 via a central portion 150.

The jaw assembly 112 is assembled by disposing cam 128 in cavity 130 of master jaw 116, as indicated by arrow D' through aperture 136. Cavity 178 of cam 128 is configured to receive the cylindrical member 144 of the clamping device 126, as indicated by arrow B'. When the clamping device 126 is disposed in the master jaw 116, the dovetail portion 142 rests above the coplanar top surfaces 134 of master jaw 116. Groove 54 of top jaw 18 is then aligned with dovetail portion 142 and the top jaw 18 is slid onto the dovetail portion 142 and into engagement with master jaw 116, as indicated be arrow C'. It is to be appreciated that once the top jaw 18 is located in a desired position, the mating of the serrations 68 of the top jaw 18 and the serrations 140 of the master jaw 116 will prevent further movement of the top jaw 18.

The top jaw 18 is securely fixed to the master jaw 116 by cam 128. The cam 128 will act upon the cylindrical member 144 to pull the dovetail portion 142 down in the direction of arrow B' and subsequently the top jaw 18. The cam 128 will act upon the clamping device 126 by rotating the cam 128 via any suitable tool coupled to the hexagonal aperture 174. When rotated, the cut-away portion 180 of cam 128 will engage the central portion 150 of the clamping device 126 and pull the dovetail potion 142 and subsequently the top jaw down into engagement with the master jaw. In this manner, the cam 128 drives the clamping device 126 in a downward motion along with the top jaw 18 urging the serrations 140,68 on the jaws into and maintaining the surfaces 134,64,66 in coengagement to assure precise top jaw and master jaw alignment.

Figure 18:
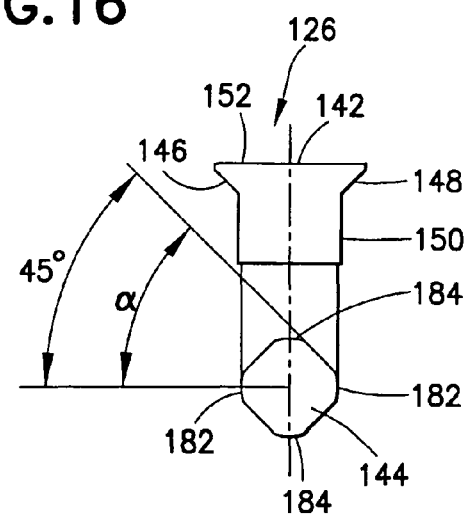
FIG. 18 is a side elevational view of the dovetail clamp employed in the jaw assembly of FIG. 14.

In one embodiment, to prevent binding between the cylindrical member 144 and cam 128, the generally cylindrical member 144 is configured in a diamond shaped cross-section as can be best seen in FIG. 18. Opposing corners of the diamond shaped member 144 are configured to facilitate movement of the cam 128 about the member 144. Here, first opposing corners 182 are configured as flat surfaces and second opposing corners 184 are configured as a radius defined by predetermined angle "a". In this exemplary embodiment, angle "a" is about 45 degrees but other values may be used.

A quick change jaw assembly for a chuck has been provided. The jaw assembly of the present disclosure can be employed on a conventional chuck and requires no modification to the chuck. By having a single mechanism, e.g., the cam, to clamp or lock the top jaw in place, the jaw assembly of the present disclosure can be changed on a conventional chuck in approximately one minute as compared to conventional jaw assemblies which can take up to ten minutes to change. Furthermore, due to its adjustable nature, matched pairs of master and top jaws in various sizes are not required to be kept in inventory.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A quick change jaw assembly for a chuck having a rotational axis comprising:
   a master jaw configured for mounting to the chuck for movement toward and away from the rotational axis, the master jaw including a first pair of coplanar abutment surfaces defining a first aperture;
   a clamping device including a dovetail portion being disposed in the first aperture of the master jaw, wherein the dovetail portion rests above the first pair of coplanar top surfaces of master jaw, the clamping device further including a cylindrical member extending from the dovetail portion, the cylindrical member being disposed in the aperture of the master jaw;
   a top jaw formed with a groove longitudinally extending along a length of the top jaw, the groove being complementary to the dovetail portion and configured for engaging the dovetail portion, the top jaw including a second pair of coplanar abutment surfaces extending along opposite sides of the groove; and
   a cam disposed in the master jaw for actuating the clamping device for urging the second pair of coplanar abutment surfaces of the top jaw into coengagement with the first pair of coplanar abutment surfaces of the master jaw.

2. The quick change jaw assembly of claim 1, wherein the first and second pair of coplanar abutment surfaces include serrations.

3. The quick change jaw assembly of claim 1, wherein the top jaw is variably positioned along the master jaw.

4. The quick change jaw assembly of claim 1, wherein the clamping device includes at least one ring member extending from the dovetail portion, the at least one ring member being disposed in the aperture of the master jaw.

5. The quick change jaw assembly of claim 4, wherein the cam is formed with a first cylindrical portion and a second cylindrical portion positioned eccentric from each other along a central longitudinal axis of the cam.

6. The quick change jaw system of claim 5, wherein the first and second cylindrical portions of the cam are disposed within the at least one ring member of the clamping device.

7. The quick change jaw system of claim 1, wherein the cam is accessible externally from a second aperture in the master jaw.

8. The quick change jaw assembly of claim 1, wherein the cam is generally cylindrical and hollow with a rectangular aperture for receiving the cylindrical member of the clamping device.

9. The quick change jaw system of claim 8, wherein the cam is accessible externally from a second aperture in the master jaw.

10. A quick change jaw assembly for a chuck having a rotational axis comprising:
    a master jaw configured for mounting to the chuck for movement toward and away from the rotational axis, the master jaw including a first pair of coplanar abutment surfaces defining a first aperture;
    a clamping device including a dovetail portion being disposed in the first aperture of the master jaw, wherein the dovetail portion rests above the first pair of coplanar top surfaces of master jaw, the clamping device further including a diamond shaped member extending from the dovetail portion, the diamond shaped member being disposed in the aperture of the master jaw;
    a top jaw formed with a groove longitudinally extending along a length of the top jaw, the groove being complementary to the dovetail portion and configured for engaging the dovetail portion, the top law including a second pair of coplanar abutment surfaces extending along opposite sides of the groove; and
    a cam disposed in the master jaw for actuating the clamping device for urging the second pair of coplanar abutment surfaces of the top jaw into coengaqement with the first pair of coplanar abutment surfaces of the master jaw.

11. The quick change jaw assembly of claim 10, wherein the cam is generally cylindrical and hollow with a rectangular aperture for receiving the diamond shaped member of the clamping device.

12. The quick change jaw assembly of claim 11, wherein the diamond shaped member of the clamping device includes first opposing corners configured as flat surfaces and second opposing corners configured as a radius defined by a predetermined angle.

13. A quick change jaw assembly for a chuck having a rotational axis comprising:
    a master jaw configured for mounting to the chuck for movement toward and away from the rotational axis, the master jaw including a first pair of coplanar abutment surfaces defining a first aperture, the first pair of coplanar abutment surfaces include serrations;
    a clamping device including a dovetail portion and cylindrical member extending from the dovetail portion, the cylindrical member being disposed in the first aperture of the master jaw, wherein the dovetail portion rests above the first pair of coplanar top surfaces of master jaw;
    a top jaw formed with a groove longitudinally extending along a length of the top jaw, the groove being complementary to the dovetail portion and configured for engaging the dovetail portion, the top jaw including a second pair of coplanar abutment surfaces extending along opposite sides of the groove, the second pair of coplanar abutment surfaces include serrations complementary to the serrations of the first pair of coplanar abutment surfaces; and a cam disposed in the master jaw for actuating the clamping device for urging the second pair of coplanar abutment surfaces of the top jaw into coengagement with the first pair of coplanar abutment surfaces of the master jaw, the cam being generally cylindrical and hollow with a rectangular aperture for receiving the cylindrical member of the clamping device, wherein the cam is accessible externally from a single, second aperture in the master jaw for actuation, wherein the top jaw is variably positioned along the master jaw.

14. The quick change jaw assembly of claim 13 wherein the cam is generally cylindrical and hollow with a rectangular aperture for receiving the diamond shaped member of the clamping device.

15. The quick change jaw assembly of claim 14, wherein the diamond shaped member of the clamping device includes first opposing corners configured as flat surfaces and second opposing corners configured as a radius defined by a predetermined angle.

* * * * *